(12) United States Patent
Sasaki et al.

(10) Patent No.: US 7,775,472 B2
(45) Date of Patent: Aug. 17, 2010

(54) INFORMATION MEDIUM

(75) Inventors: Morimasa Sasaki, Tokyo (JP);
Takateru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 247 days.

(21) Appl. No.: 11/836,498

(22) Filed: Aug. 9, 2007

(65) Prior Publication Data
US 2008/0035776 A1    Feb. 14, 2008

(30) Foreign Application Priority Data
Aug. 10, 2006  (JP) .............................. 2006-217607

(51) Int. Cl.
*G11B 23/04*    (2006.01)
(52) U.S. Cl. ................ 242/345.2; 242/345.3
(58) Field of Classification Search .......... 242/345, 242/345.2, 345.3, 347, 341
See application file for complete search history.

(56) References Cited

U.S. PATENT DOCUMENTS

| | | | | |
|---|---|---|---|---|
| 4,101,096 A | * | 7/1978 | Oishi et al. | 242/345.2 |
| 4,466,036 A | * | 8/1984 | Ishida et al. | 242/345.3 |
| 4,516,181 A | * | 5/1985 | Shirako | 242/345.3 |
| 4,563,718 A | * | 1/1986 | Shirako | 242/345.3 |
| 4,742,417 A | * | 5/1988 | Komiyama et al. | 242/347.1 |
| 4,881,146 A | * | 11/1989 | Bordignon | 242/345.3 |
| 7,552,887 B2 | * | 6/2009 | Sasaki | 242/345.2 |
| 2006/0175451 A1 | | 8/2006 | Sasaki et al. | |
| 2007/0183094 A1 | | 8/2007 | Sasaki | |

FOREIGN PATENT DOCUMENTS

| | | |
|---|---|---|
| JP | 2000 137971 | 5/2000 |
| JP | 2004-296046 | 10/2004 |
| JP | 2005-235274 | 9/2005 |
| JP | 2005-293691 | 10/2005 |

OTHER PUBLICATIONS

English language Abstract of JP 2000-137971.

* cited by examiner

*Primary Examiner*—Evan H Langdon
(74) *Attorney, Agent, or Firm*—Greenblum & Bernstein P.L.C.

(57) ABSTRACT

An information medium capable of preventing inclination of tape reels driven for rotation. The information medium includes a pair of tape reels around which a magnetic tape is wound, a casing body rotatably accommodating the tape reels, and a pair of sheets in which a pair of insertion holes are formed, respectively. A pair of plate-shape spring members for urging at least one end of each reel body via an associated one of the sheets having opposite ends of respective hubs inserted into the insertion holes formed in the sheets are arranged at least one of a gap between one of the sheets, disposed toward one ends of the respective reel bodies, and one of main boards, and a gap between the other of the sheets, disposed toward the other ends of the respective reel bodies, and the other of the main boards.

10 Claims, 10 Drawing Sheets

INFORMATION MEDIUM

BACKGROUND OF THE INVENTION

1. Field of the Invention

The present invention relates to an information medium provided with a pair of tape reels having a magnetic tape wound therearound, and a casing body rotatably accommodating the tape reels.

2. Description of the Related Art

As an information medium of this kind, there is known a tape cartridge disclosed in Japanese Laid-Open Patent Publication (Kokai) No. 2000-137971. This tape cartridge is comprised of a pair of reels having a magnetic tape wound therearound, a shell formed by an upper half and a lower half, and an upper sheet and a lower sheet disposed in the shell in a manner sandwiching the reels. In this case, each reel includes an inner hollow cylindrical portion in the form of a hollow cylinder, and an outer hollow cylindrical portion formed along the outer periphery of the inner cylindrical portion in a manner continuous therewith. The upper end and the lower end of the inner hollow cylindrical portion are configured such that they protrude from the upper end and the lower end of the outer hollow cylindrical portion, respectively, and the lower end of the inner hollow cylindrical portion is loosely fitted in a reel-receiving portion of the lower half of the shell, whereby the reel is rotatably accommodated in the shell. Further, the inner peripheral surface of the inner hollow cylindrical portion of the reel is formed with convex portions for being engaged with a drive shaft (spindle) of a recording and reproducing device when the drive shafts are inserted.

SUMMARY OF THE INVENTION

From the study of the aforementioned tape cartridge, however, the present inventors found out the following problems: A tape cartridge of this kind, such as the aforementioned tape cartridge, is configured such that so as to permit each drive shaft of the recording and reproducing device to be smoothly inserted into the inner hollow cylindrical portion of each reel, a gap is formed between the inner peripheral surface of the inner hollow cylindrical portion of the reel and the drive shaft. Further, the tape cartridge of this kind is configured such that for smooth rotation of each reel, gaps are also formed between the shell and the inner hollow cylindrical portion of the reel and between the shell and the outer hollow cylindrical portion thereof. On the other hand, among recording and reproducing devices for the tape cartridge of this kind (e.g., a tape cartridge 201 shown in FIG. 19), there is one generally configured as shown in FIG. 19 such that reels of the tape cartridge are driven in a state in which the foremost end of each drive shaft 101 is inserted to a position corresponding to approximately one half of the height (vertical length) of the inner hollow cylindrical portion of each reel. Further, in this recording and reproducing device, as shown in FIG. 20, a helical scan method is employed in which a magnetic tape T is brought into contact with an outer peripheral surface of a rotary head 102 by a plurality of guide rollers 103 and guide pins 104 to thereby perform recording and reproducing of data. This causes a relatively large tension to be applied to the magnetic tape T during driving of the reels. Therefore, in the tape cartridges of the above-mentioned kind, including the aforementioned tape cartridge, a moment caused by the tension applied to the magnetic tape T acts on an upper portion of the inner hollow cylindrical portion of each reel, within which the inserted drive shaft 101 does not extend, whereby the reel is sometimes inclined slightly by the amount of the above-described gap.

In recent years, a tape cartridge (e.g., a tape cartridge 202 shown in FIG. 21) has been devised which uses a magnetic tape a width of which is made approximately twice as large as that of the conventional ones so as to increase recording capacity. When this tape cartridge is driven by the recording and reproducing device described above, as shown in FIG. 21, the vertical length of the portion within which the inserted drive shaft 101 does not extend increases. Further, in the tape cartridge 202 using the magnetic tape increased in width, compared with a tape cartridge using a tape with a smaller width, it is necessary to increase the distance over which the tape is brought into contact with the rotary head 102 due to the increased width of the tape (see FIG. 12), which also increases a tension applied to the magnetic tape T. Therefore, in the tape cartridges of the above-mentioned kind, including the aforementioned tape cartridge, there is a risk that the reels are largely inclined during driving thereof. As a result, they suffer from the problem that the rotations of the reels in the inclined state can cause the magnetic tape T to run in a meandering manner or in a state laterally shifted toward one side, thus hindering proper recording or reproducing of data. Further, there is another risk that the running of the magnetic tape T in the meandering manner or in the state laterally shifted toward one side causes an edge of the magnetic tape T (end in the direction of the width thereof) to be rubbed hard against the upper sheet or the lower sheet, whereby the magnetic tape T is damaged.

The present invention has been made in view of these problems, and a main object of the present invention is to provide an information medium which is capable of preventing tape reels from being inclined during driving thereof.

To attain the above main object, an information medium according to the present invention comprises a pair of tape reels each having a hollow cylindrical reel body having a magnetic tape wound therearound, and a hollow cylindrical hub disposed at a central portion of the reel body in a manner such that opposite ends thereof protrude from the reel body, a casing body rotatably accommodating the pair of tape reels in a state holding opposite ends of the hubs by a pair of main boards facing each other, a pair of sheet materials each having a pair of insertion holes formed therein, and arranged in the casing body in a manner sandwiching opposite ends of each reel body in a state having opposite ends of the hubs inserted into the insertion holes, and a pair of plate-shape urging members arranged in at least one of a gap between one of the sheet materials, disposed toward respective one ends of the reel bodies, and one of the main boards, and a gap between the other of the sheet materials, disposed toward respective other ends of the reel bodies, and the other of the main boards, each of the pair of plate-shape urging members having an insertion hole formed therein, and urging at least one of the opposite ends of each reel body via an associated one of the sheet materials, in a state in which at least one of the opposite ends of each hub is inserted in the insertion hole.

According to this information medium, the pair of plate-shape urging members for urging one ends of the pair of reel bodies via an associated one of the sheet materials having opposite ends of the respective hubs inserted into the insertion holes formed therein are arranged between at least one of the sheet materials and an associated one of the main boards of the casing body. This makes it possible to press one ends of the reel bodies against an associated one of the main boards by the urging members. Therefore, even when a relatively large tension is applied to the magnetic tape so as to bring the magnetic tape into contact with the rotary head of a drive unit, and a large moment acts on the tape reels due to the tension, the tape reels can be reliably prevented from being inclined. Therefore, according to the information medium, it is possible to reliably prevent the recording and reproducing of data from being hindered by running of the magnetic tape in a meandering manner or in a state laterally shifted toward one side, which can be caused by the rotations of inclined tape reels, or the magnetic tape from being damaged by having an edge (end in the direction of the width thereof) thereof rubbed hard against the sheet material.

In this case, each of the urging members can be formed to be bent such that the urging member has three convex portions which can urge three portions of the at least one of opposite ends of each reel body via the associated one of the sheet materials. With this arrangement, unlike urging members each having two or less or four or more convex portions, all the three convex portions reliably urge the ends via the associated sheet material, and hence it is possible to evenly urge the ends, thereby making it possible to more reliably prevent the tape reels from being inclined.

Also, an information medium according to the present invention comprises a pair of tape reels each having a hollow cylindrical reel body having a magnetic tape wound therearound, and a hollow cylindrical hub disposed at a central portion of the reel body in a manner such that opposite ends thereof protrude from the reel body, a casing body rotatably accommodating the pair of tape reels in a state holding opposite ends of the hubs by a pair of main boards facing each other, a pair of sheet materials each having a pair of insertion holes formed therein, and arranged in the casing body in a manner sandwiching opposite ends of each reel body in a state having opposite ends of the hubs inserted into the insertion holes, and a plate-shape urging member arranged in at least one of a gap between one of the sheet materials, disposed toward respective one ends of the reel bodies, and one of the main boards, and a gap between the other of the sheet materials, disposed toward respective other ends of the reel bodies, and the other of the main boards, the plate-shape urging member having a pair of insertion holes formed therein, and urging at least one of the opposite ends of each reel body via an associated one of the sheet materials, in a state in which at least one of the opposite ends of each hub is inserted in an associated one of the insertion holes.

According to this information medium, the plate-shape urging member having a pair of insertion holes formed therein, and urging at least one of the opposite ends of each reel body via an associated one of the sheet materials, in a state in which at least one of the opposite ends of each hub is inserted in an associated one of the insertion holes is disposed between at least one of the sheet materials and an associated one of the main boards of the casing body. This makes it possible to press one ends of the reel bodies against an associated one of the main boards by the urging members. Therefore, even when a relatively large tension is applied to the magnetic tape, and a large moment acts on the tape reels due to the tension, the tape reels can be reliably prevented from being inclined. Therefore, according to the information medium, it is possible to reliably prevent the recording and reproducing of data from being hindered by running of the magnetic tape in a meandering manner or in a state laterally shifted toward one side, which can be caused by the rotations of inclined tape reels, or the magnetic tape from being damaged by having an edge thereof rubbed hard against the sheet material.

In this case, the urging member is formed by connecting a pair of annular bodies, as a unitary member, each of the annular bodies being formed to be bent such that the annular body has three convex portions which can urge three portions of the at least one of the opposite ends of each reel body via the associated one of the sheet materials. With this arrangement, the two annular bodies can be fixed in a single operation, so that compared with a construction in which two annular bodies formed independently of each other are fixed separately, it is possible to simplify the assembling process, thereby making it possible to sufficiently enhance the manufacturing efficiency of the information medium.

Further, it is possible to employ a construction in which the urging members are arranged in a gap between one of the main boards positioned on a side opposite from a side where drive shafts for driving the tape reels are inserted, and an associated one of the sheet materials. With this arrangement, the reel bodies can be pressed toward the main board positioned on the side where the drive shafts are inserted, and hence compared with a construction in which the reel bodies are pressed in a direction opposite to the above pressing direction, it is possible to increase the length of respective engaged portions of each hub and an associated one of the drive shafts. Therefore, it is possible to reduce the moment acting on the reel body.

Further, it is possible to employ a construction in which the urging members are fixed to an associated one of the main boards. With this arrangement, when the information medium is manufactured, the urging members can be accurately and easily arranged by assembling the casing body. This makes it possible to sufficiently enhance the manufacturing efficiency of the information medium. Further, since the urging members are fixed to one of the main boards, the urging members can be reliably prevented from being removed from the ends of the hubs to be thereby brought into contact with the magnetic tape, e.g., by vibration occurring during conveyance when the components are assembled.

Alternatively, it is also possible to employ a construction in which the urging members are mounted on an associated one of the sheet materials. With this arrangement, the urging members can be arranged in a state positioned at predetermined positions simply by positioning the sheet material at a predetermined position and disposing the same, and hence it is possible to sufficiently enhance the manufacturing efficiency of the information medium.

It should be noted that the present disclosure relates to the subject matter included in Japanese Patent Application No. 2006-217607 filed Aug. 10, 2006, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Hereinafter, the best mode of an information medium according to the invention will be described with reference to the accompanying drawings.

First, a description will be given of the construction of the information medium 1 with reference to the drawings.

Figure 1:
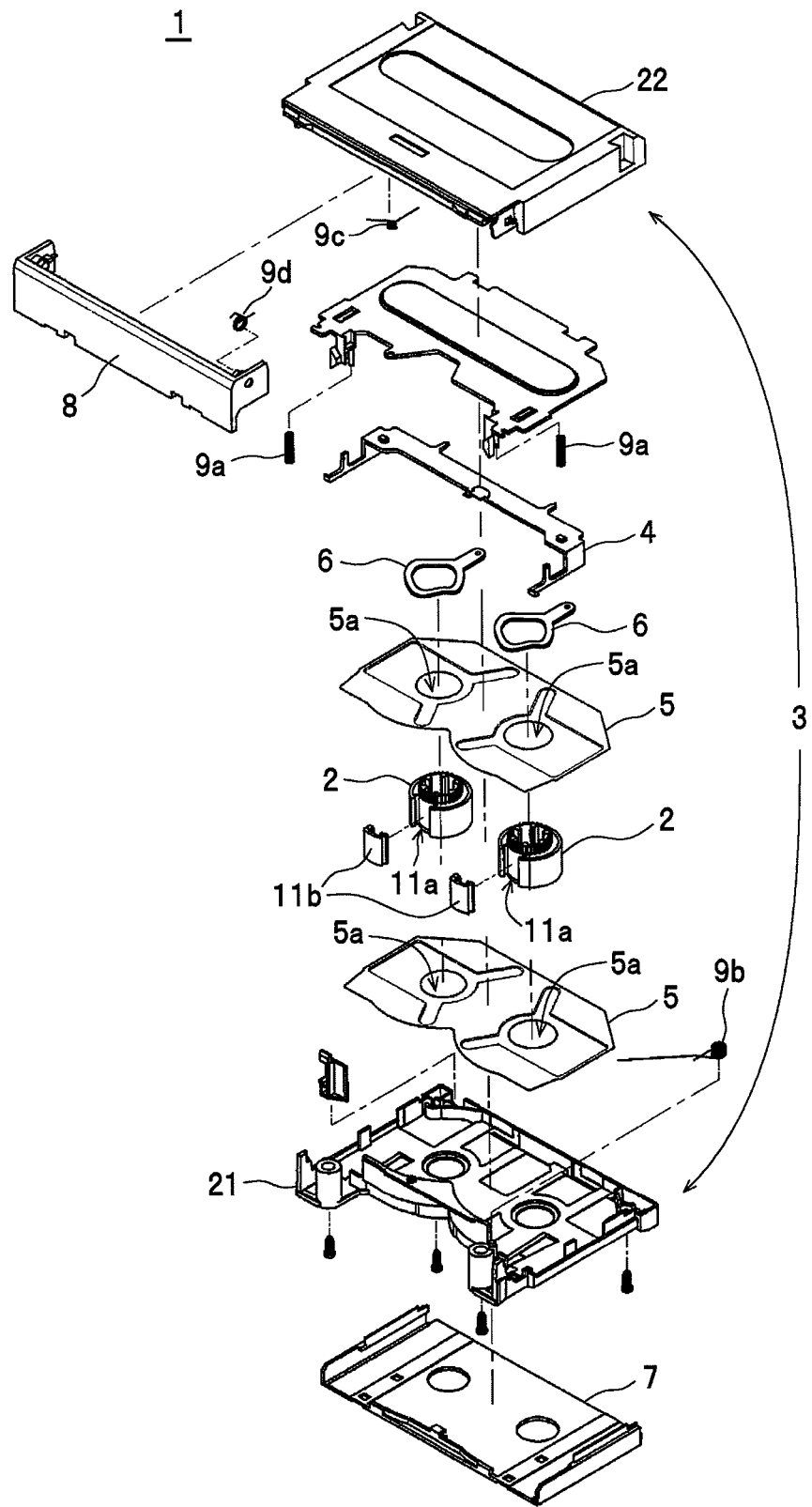
FIG. 1 is an exploded perspective view of an information medium.
Figure 2:
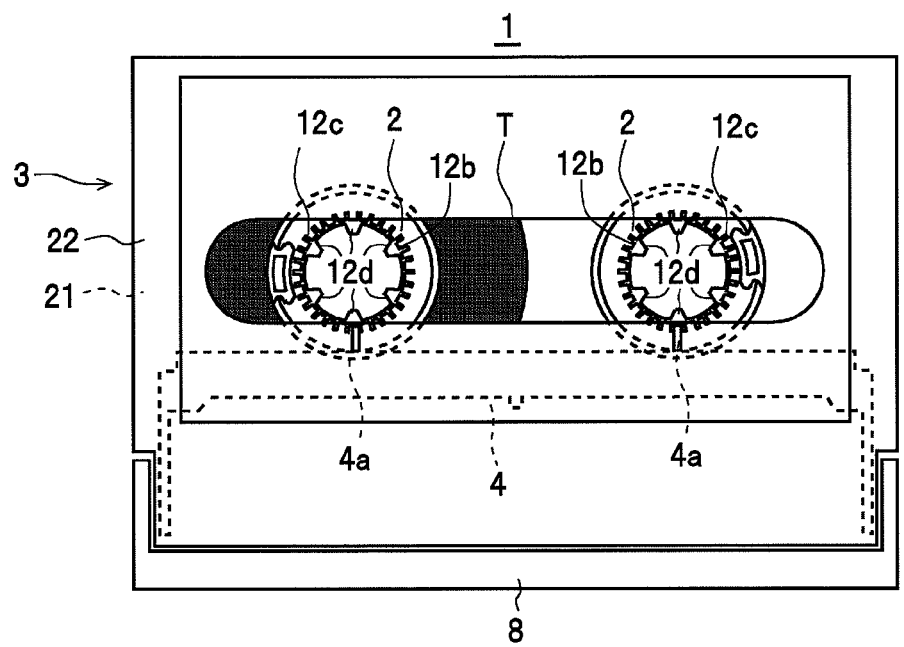
FIG. 2 is a plan view of the information medium.
Figure 3:
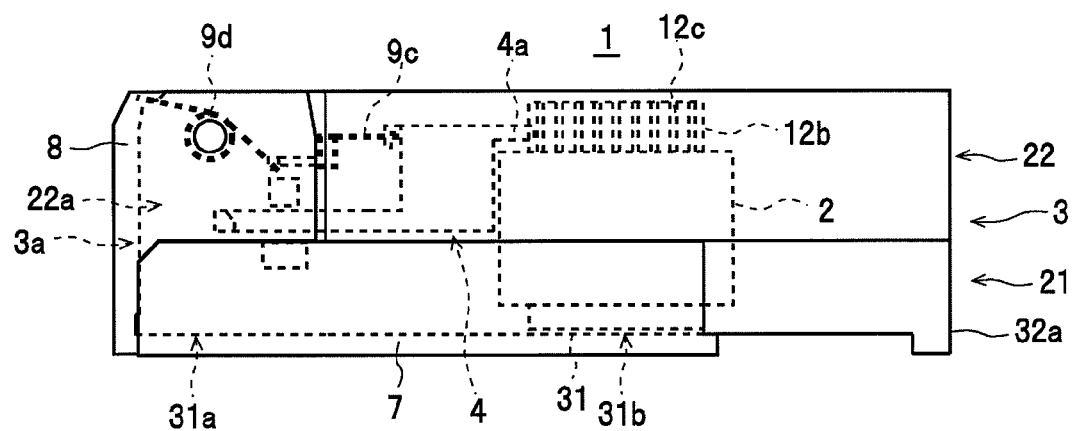
FIG. 3 is a side view of the information medium.

Referring to FIGS. 1 to 3, the information medium 1 is e.g., a two-reel type information medium for use as a storage device for backing up data recorded on an electronic computer, and is comprised of tape reels 2 wound with a magnetic tape T (see FIGS. 2 and 11), a casing body 3, a reel brake 4, sheets 5, spring members 6, a sliding section 7, and a lid 8. In this case, the information medium 1 employs a magnetic tape T having a tape width of 8 mm, for example, and the sizes and the shapes of the component elements constructing the information medium 1 are defined in a manner adapted to the magnetic tape T.

Figure 7:
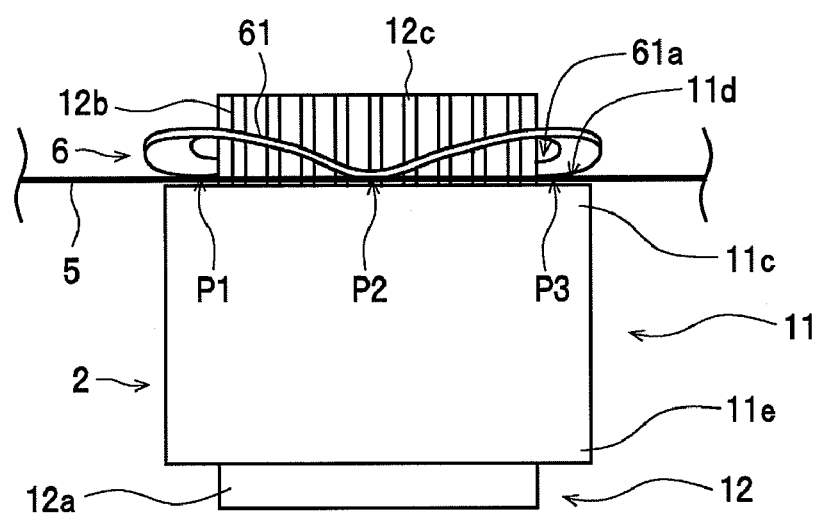
FIG. 7 is a side view of a tape reel, a sheet, and the spring member in an arranged state.
Figure 11:
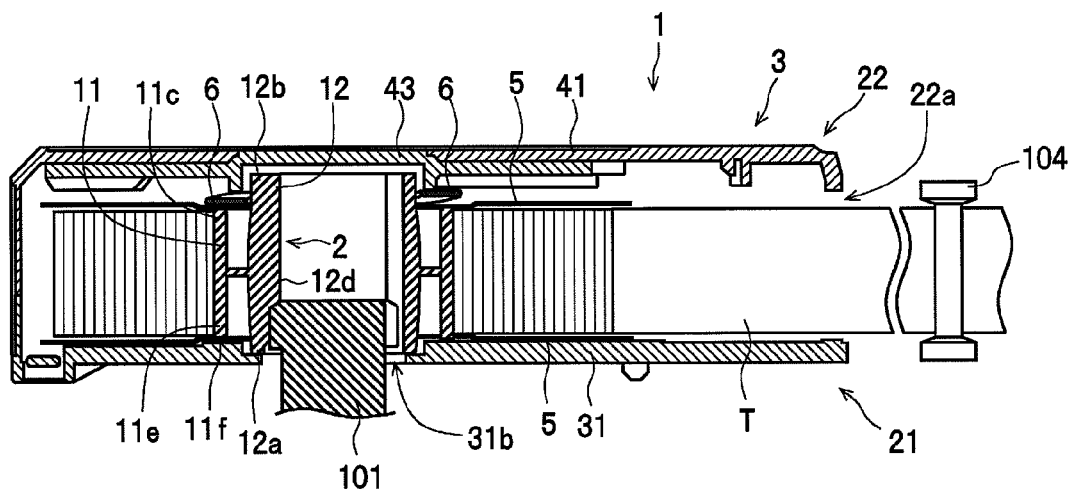
FIG. 11 is a cross-sectional view of the information medium.

Referring to FIG. 7, each tape reel 2 is comprised of a reel body 11 and a hub 12. The reel body 11 is in the form of a hollow cylinder and is configured such that the magnetic tape T can be wound therearound. Further, as shown in FIG. 1, the reel body 11 has an outer periphery formed with a clamp-accommodating portion 11a in which can be fitted a clamp 11b for fixing a leader tape, not shown, attached to an end of the magnetic tape T, to the reel body 11. As shown in FIG. 7, the hub 12 is formed to have a hollow cylindrical shape, and is disposed at a central portion of the reel body 11 such that a lower end 12a and an upper end 12b thereof protrude from the reel body 11. Further, as shown in FIGS. 2 and 3, the hub 12 has the upper end 12b formed with teeth 12c with which an associated one of protrusions 4a of a reel brake 4 is engaged to thereby restrict the rotation of the tape reel 2. Further, as shown in FIGS. 2 and 11, the hub 12 has an inner peripheral surface formed with e.g., six engaging protrusions 12d which can be engaged with drive shafts 101 of a drive unit (recording and reproducing device) (see FIG. 11). In this case, as shown in FIGS. 2 and 11, the tape reel 2 is rotatably accommodated within the casing body 3 in a state in which the lower end 12a and the upper end 12b of the hub 12 are supported by a bottom board 31 of a lower casing 21, described hereinafter, and (a cover 43 attached to) a top board 41 of an upper casing 22, described hereinafter, of the casing body 3. It should be noted that the bottom board 31 and the top board 41 correspond to main boards in the present invention.

Figure 4:
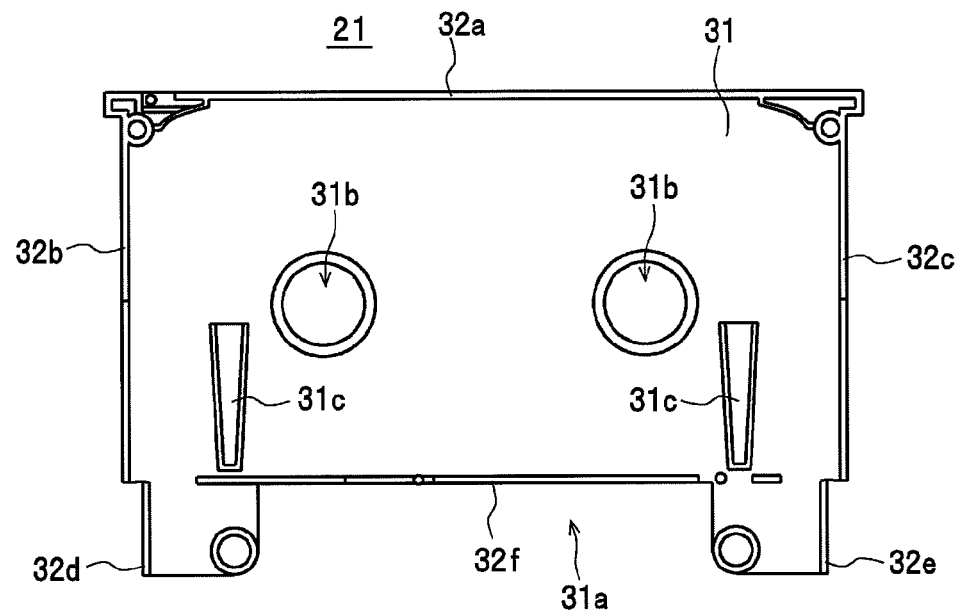
FIG. 4 is a plan view of a lower casing, as viewed from an inner side thereof.

Referring to FIGS. 1 and 3, the casing body 3 is comprised of the lower casing 21 and the upper casing 22, which are capable of being fitted to each other, and rotatably accommodates the tape reels 2 in an internal space formed when the casings 21 and 22 are fitted to each other. As shown in FIG. 4, the lower casing 21 is comprised of the bottom board 31, and side walls 32a to 32f erected on the edges of the bottom board 31, and is formed to be generally shallow plate-shaped. The bottom board 31 has a cutaway portion 31a formed at a central portion thereof on a front side (lower side, as viewed in FIG. 4). In this case, a tape draw-out opening 3a (see FIG. 3) for drawing out the magnetic tape T is formed by the cutaway portion 31a and an opening 22a of the upper casing 22, described hereinafter. Further, the bottom board 31 is formed with circular insertion holes 31b for supporting the lower ends 12a of the hubs 12 of the tape reels 2 by edges thereof, and having the drive shafts 101 of the drive unit inserted therethrough.

Further, formed on the side toward the cutaway portion 31a of the bottom board 31 are arm-shape locking portions 31c for locking the sliding section 7 in a non-slidable state. In this case, each locking portion 31c has a foremost end thereof urged toward the sliding section 7 by an associated one of lock springs 9a appearing in FIG. 1.

Figure 5:
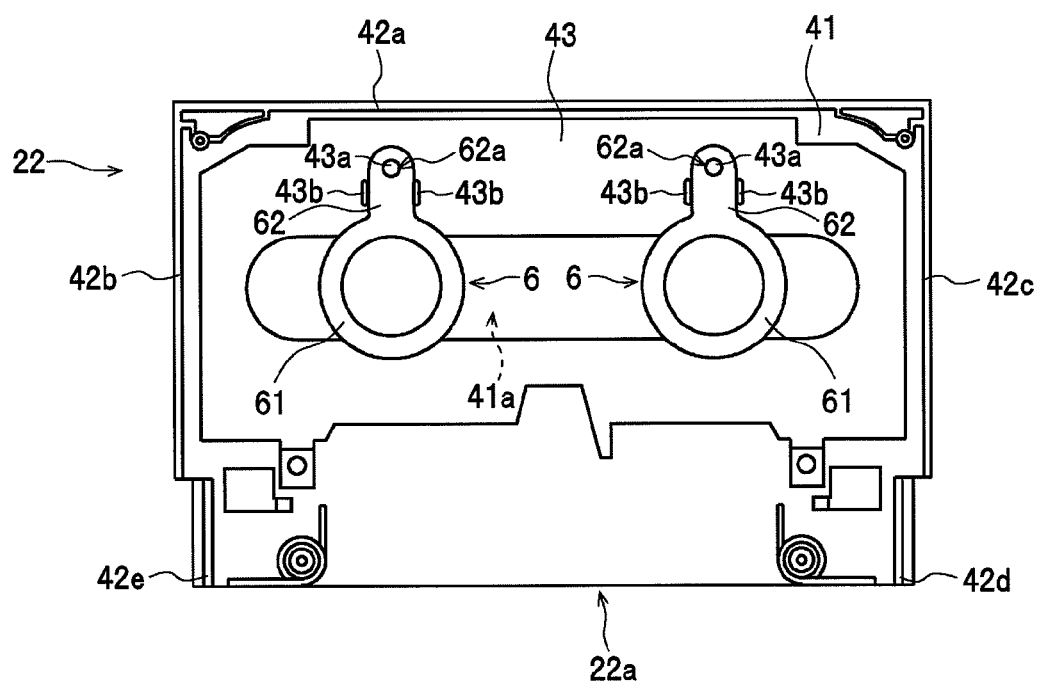
FIG. 5 is a plan view of an upper casing, as viewed from an inner side thereof.

Referring to FIG. 5, the upper casing 22 is comprised of the top board 41, and side walls 42a to 42e erected on the edges of the top board 41, and is formed to have a shallow plate-shape having the opening 22a on the front side (lower side, as viewed in FIG. 5). The top board 41 is formed to have a generally rectangular shape. Further, the top board 41 has a central portion formed with an opening 41a having an elliptic shape, and to the opening 41a is attached the cover 43 which is transparent (or substantially transparent), supports the upper ends 12b of the hubs 12 of the tape reels 2, and functions as a window for use in viewing the magnetic tape T from the outside of the casing body 3. In this case, as shown in FIG. 5, the cover 43 is formed with protrusions 43a for fixing the spring members 6, and ribs 43b for positioning the spring members 6.

As shown in FIGS. 2 and 3, the reel brake 4 is disposed within the casing body 3 in a manner slidable in a direction toward or away from the tape reels 2, and is urged by a brake spring 9c appearing in FIG. 1 in a direction in which the reel brake 4 is moved toward the tape reels 2. Further, the reel brake 4 is caused to slide in accordance with pivotal motions of the lid 8, thereby performing restriction of the rotations of the tape reels 2, and cancellation of the restriction of the rotations of the tape reels 2. As shown in FIG. 1, the sheets 5 each have insertion holes 5a through which the respective hubs 12 of the tape reels 2 can be inserted. Further, as shown FIG. 11, the sheets 5 are arranged between a lower end 11e of the reel body 11 of each tape reel 2 and the bottom board 31 of the lower casing 21, and between an upper end 11c of the reel body 11 and the top board 41 of the upper casing 22, respectively. In this case, the sheets 5 have the functions of causing the tape reels 2 to rotate smoothly, and restricting motions of the magnetic tape T in the direction of the width thereof.

Figure 6:
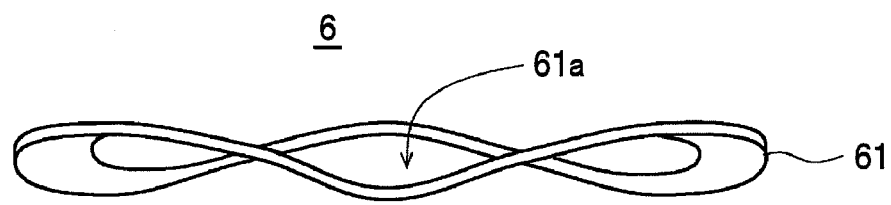
FIG. 6 is a side view of a spring member.
Figure 8:
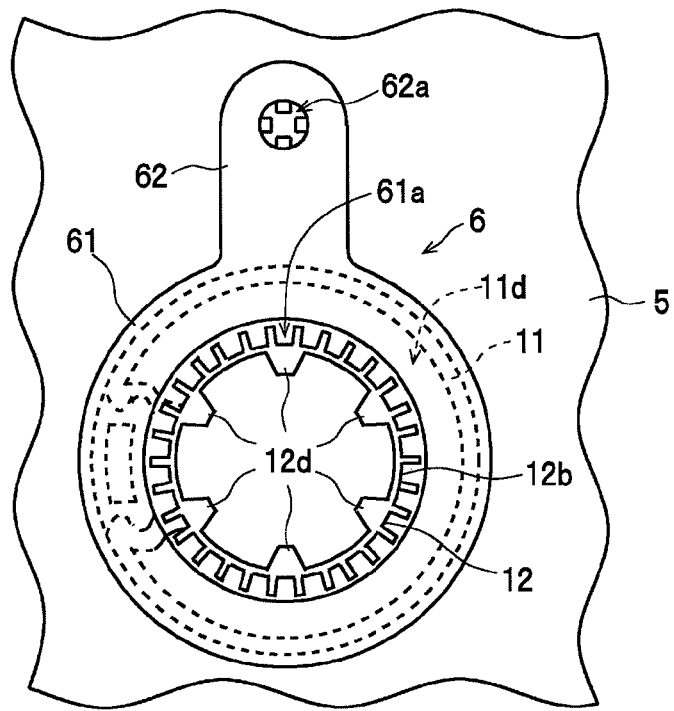
FIG. 8 is a plan view of the tape reel, the sheet, and the spring member in the arranged state.

The spring members 6 correspond to urging members in the present invention. As shown in FIG. 5, each spring member 6 is comprised of a body portion 61, and a fixing portion 62 integrally formed with the body portion 61. Referring to FIGS. 6 to 8, the body portion 61 is formed by bending a plate-shape body in a wavy manner (a wave washer-like shape) such that the body portion 61 can be elastically deformed in the direction of the thickness thereof. The plate-shape body is formed with an insertion hole 61a in a central portion thereof such that the upper end 12b of the hub 12 of the associated tape reel 2 can be inserted, and has a generally circular shape in plan view (i.e., a generally annular shape). The fixing portion 62 is in the form of a plate, and as shown in FIG. 8, has a foremost end thereof formed with a fixing hole 62a. In this case, the fixing hole 62a has an edge thereof formed with a plurality of nails for causing the fixing portion 62 to function as a push nut.

Figure 9:
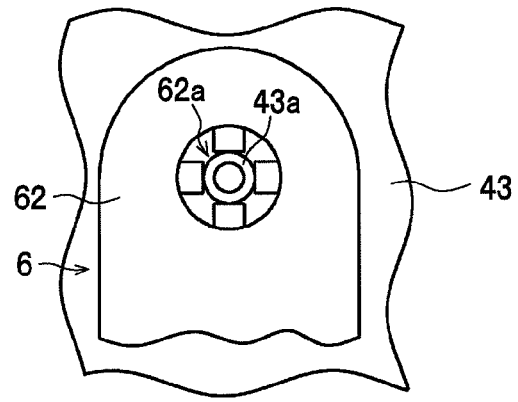
FIG. 9 is a plan view of the spring member fixed to a cover.
Figure 10:
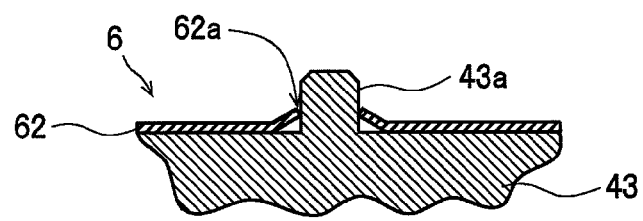
FIG. 10 is a cross-sectional view of the spring member fixed to the cover.

In this case, as shown in FIGS. 5, 9, and 10, each spring member 6 is fixed to the cover 43 by press-fitting an associated one of the protrusion 43a formed on the cover 43 of the upper casing 22 into the fixing hole 62a of the fixing portion 62 thereof. Referring to FIG. 11, in an assembled state of the information medium 1, the spring member 6 is disposed in a gap between the sheet 5 disposed toward the upper end 11c (one end side, in the present invention) of the reel body 11 of an associated one of the tape reels 2 and the top board 41 (the cover 43) of the upper casing 22. Further, as shown in FIG. 7, the spring member 6 urges an end face 11d of the upper end 11c of the reel body 11 toward the lower end 11e (i.e., the bottom board 31 of the lower casing 21) via the sheet 5 in a state in which the upper end 12b of the hub 12 of the tape reel 2 is inserted into the insertion hole 61a. In this case, as shown in FIG. 7, the spring member 6 is formed into a bent shape such that it has three convex portions protruding downward for urging three portions (e.g., portions indicated by P1 to P3 in FIG. 7) of the end face 11d of the reel body 11 via the sheet 5.

Referring to FIG. 3, the sliding section 7 is slidably mounted on the outside of the lower casing 21. Further, the sliding section 7 is urged toward the cutaway portion 31a of the lower casing 21 by a slider spring 9b appearing in FIG. 1. Referring to FIG. 3, the lid 8 is pivotally mounted on the front side (left side, as viewed in FIG. 3) of the casing body 3 (upper casing 22), and is pivotally moved by the drive unit to thereby open and close the opening 22a (tape draw-out opening 3a of the casing body 3) of the upper casing 22. Further, the lid 8 is urged in the direction of closing the opening 22a by a lid spring 9d appearing in FIG. 1.

Next, an example of a method of manufacturing the information medium 1 will be described with reference to the drawings.

Referring first to FIG. 1, the slider spring 9b is mounted on the lower casing 21 of the casing body 3. Then, the sliding section 7 is mounted on the outside of the lower casing 21, while causing one end of the slider spring 9b to be engaged with the sliding section 7. Subsequently, as shown in FIG. 1, one of the sheets 5 is placed inside the bottom board 31 of the lower casing 21, and the tape reels 2 having the magnetic tape T wound therearound (illustration of the magnetic tape T is omitted in FIG. 1) are placed on the sheet 5. After that, the other sheet 5 is placed on the tape reels 2.

Then, as shown in FIG. 5, the spring members 6 are fixed to the cover 43 which are mounted on the top board 41 of the upper casing 22 in advance. More specifically, the fixing portions 62 of the respective spring members 6 are each fitted between each pair of ribs 43b of the cover 43, and the protrusions 43a of the cover 43 are press-fitted into the respective fixing hole 62a of the fixing portions 62. In doing this, as shown in FIGS. 9 and 10, the nails formed on the edge of the fixing hole 62a are deformed to reliably fix the fixing portions 62 to the protrusions 43a, and the spring members 6 are reliably positioned by the ribs 43b.

Next, the lock springs 9a are mounted on the cover 43, whereafter the brake spring 9c is fitted into the upper casing 22. Then, the reel brake 4 is set to the upper casing 22, with one end of the brake spring 9c being engaged with the reel brake 4. Then, the lid 8 having the lid spring 9d mounted thereon is assembled to the front side of the upper casing 22. Next, as shown in FIG. 3, the lower casing 21 and the upper casing 22 are fitted to each other in a manner such that the foremost end faces of the respective side walls 32a to 32e of the lower casing 21 and the foremost end faces of the respective side walls 42a to 42e of the upper casing 22 face each other. In doing this, the upper end 12b of the hub 12 of each tape reel 2 is inserted through the insertion hole 61a of the body portion 61 of each spring member 6, whereby the spring member 6 is disposed between the sheet 5 and the top board 41 (the cover 43) of the upper casing 22. Subsequently, the casings 21 and 22 are secured by screws. This completes the information medium 1. In this case, as described hereinabove, since the spring members 6 are fixed to the top board 41 (the cover 43) of the upper casing 22 in advance, the spring members 6 are accurately and easily arranged simply by fitting the lower casing 21 and the upper casing 22 to each other.

Next, a method of recording and reproducing of data using the information medium 1 will be described with reference to the drawings.

Referring to FIG. 3, in a state in which the information medium 1 is removed from the drive unit, not shown, that is, when the information medium 1 is not in use, the reel brake 4 is moved toward the tape reels 2 by the urging force of the brake spring 9c. As a result, the protrusions 4a and 4a of the reel brake 4 are engaged with the teeth 12c of the tape reels 2, respectively, whereby the rotations of the tape reels 2 are restricted. Further, as shown in FIG. 3, the lid 8 is urged by the lid spring 9d, whereby the opening 22a of the upper casing 22 of the casing body 3 is closed. Further, the sliding section 7 is located toward the cutaway portion 31a of the bottom board 31 of the lower casing 21, and closes the insertion holes 31b of the bottom board 31, and the cutaway portion 31a thereof.

On the other hand, when the information medium 1 is inserted into an inlet of the drive unit, the drive unit draws the information medium 1 therein. In doing this, the foremost ends of the locking portions 31c of the lower casing 21 are pushed upward, whereby the sliding section 7 is released from the non-slidable state. Then, the sliding section 7 is caused to slide toward the side wall 32a of the lower casing 21 (see FIG. 3), whereby the insertion holes 31b and the cutaway portion 31a of the lower casing 21 are opened. Subsequently, the drive unit moves the information medium 1 toward the foremost ends of the drive shafts 101 of the drive unit. In doing this, as shown in FIG. 11, the drive shafts 101 are inserted through the insertion holes 31b into the central portions of the hubs 12 of the tape reels 2, whereby the engaging protrusions 12d formed on the inner peripheral surfaces of the hubs 12, and the drive shafts 101 are engaged with each other. In this case, as described above, the information medium 1 employs the magnetic tape T having a tape width of 8 mm, and the reel body 11 and the hub 12 of each tape reel 2 are formed to be longer (thicker) than those of the conventional information medium which employs a magnetic tape T having a tape width of 4 mm. Therefore, as shown in FIG. 11, the insertion of the drive shafts 101 (motion of the information medium 1) is stopped in a state in which the foremost end of each drive shaft 101 has reached a position corresponding to approximately one third of the whole length of each hub 12 from the lower end 12a of the hub 12.

Figure 12:
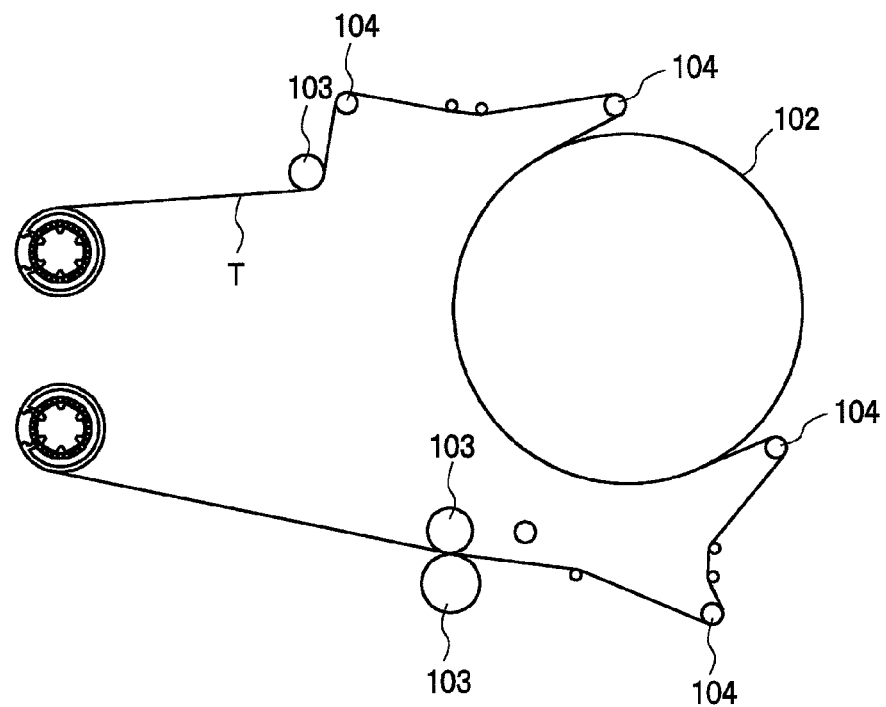
FIG. 12 is a diagram which is useful in explaining a state of the information medium in which a magnetic tape is brought into contact with a rotary head.

Then, the drive unit pivotally moves the lid 8 against the urging force of the lid spring 9d, whereby as shown in FIG. 11, the opening 22a of the upper casing 22 is opened. Further, in accordance with the pivotal motion of the lid 8, the reel brake 4 is moved toward the opening 22a, whereby the teeth 12c of the tape reels 2 and the protrusions 4a of the reel brake 4 are disengaged from each other, to thereby release the restriction of the rotations of the tape reels 2. Subsequently, as shown in FIG. 12, the drive unit moves guide rollers 103 and guide pins 104 to thereby bring the magnetic tape T into contact with approximately one half of the whole outer peripheral surface of a rotary head 102. Then, the drive unit rotates the rotary head 102 and the drive shafts 101 to start reading or writing of data. In doing this, the tape reels 2 are rotated, whereby the magnetic tape T is fed from one tape reel 2 to the other tape reel 2 via a path shown in FIG. 12, for being taken up by the other tape reel 2.

In this case, the end face 11d of the upper end 11c of the reel body 11 of each tape reel 2 is urged by the spring member 6 toward the bottom board 31 of the lower casing 21, and therefore as shown in FIG. 11, an end face 11f of the lower end 11e of the reel body 11 is pressed against the bottom board 31 of the lower casing 21 via the sheet 5. Therefore, even when a relatively large tension is applied to the magnetic tape T so as to bring the magnetic tape T into contact with the rotary head 102, and a large moment acts on the reel body 11 (tape reel 2) due to the tension, the tape reel 2 is reliably prevented from being inclined. This reliably prevents proper recording or reproducing of data from being hindered by running of the magnetic tape T in a meandering manner or in a state laterally shifted toward one side, which is caused by the rotations of inclined tape reels 2. Further, since the spring members 6 are fixed to the top board 41 of the casing body 3, they are reliably prevented from being removed from the upper ends 12b of the hubs 12 to be thereby brought into contact with the magnetic tape T, e.g., by vibration occurring during conveyance when the components are assembled.

Then, when the reading or writing of data has been terminated, the drive unit causes the information medium 1 to move away from the foremost ends of the drive shafts 101. Then, the drive unit pivotally moves the lid 8, thereby causing the lid 8 to close the opening 22a of the upper casing 22. Further, the reel brake 4 is moved toward the tape reels 2 by the urging force of the brake spring 9c in accordance with the pivotal motion of the lid 8, and the teeth 12c of the tape reels 2 and the protrusions 4a of the reel brake 4 are engaged with each other, to thereby restrict the rotations of the tape reels 2. Then, the drive unit pushes out the information medium 1 toward the outside of the inlet of the drive unit. In doing this, as shown in FIG. 3, the sliding section 7 is caused to slide toward the cutaway portion 31a of the bottom board 31 of the lower casing 21 to thereby close the cutaway portion 31a and the insertion holes 31b. This enables the information medium 1 to be taken out from the inlet of the drive unit.

As described above, according to the information medium 1, the spring members 6 are arranged between the sheet 5 and the top board 41 of the upper casing 22 of the casing body 3, whereby the respective end faces 11d of the upper ends 11c of the reel bodies 11 of the tape reels 2 can be urged toward the bottom board 31 of the lower casing 21 by the spring members 6. This makes it possible to press the end faces 11f of the lower ends 11e against the bottom board 31 of the lower casing 21 via the sheet 5. As a result, even when a relatively large tension is applied to the magnetic tape T so as to bring the magnetic tape T into contact with the rotary head 102 of the drive unit, and a large moment acts on the tape reels 2 due to the tension, the tape reels 2 can be reliably prevented from being inclined. Therefore, according to the information medium 1, it is possible to reliably prevent the recording or reproducing of data from being hindered by running of the magnetic tape T in a meandering manner or in a state laterally shifted toward one side, which can be caused by the rotations of inclined tape reels 2, or the magnetic tape T from being damaged by having an edge (end in the direction of the width) thereof rubbed hard against the sheet 5.

Furthermore, according to the information medium 1, the spring member 6 is formed by being bent such that it has three convex portions which can urge three portions of the upper end 11c of the reel body 11, whereby unlike a spring member having two or less or four or more convex portions, all the three convex portions reliably urge the end face 11d via the sheet 5, and hence it is possible to evenly urge the end face 11d, thereby making it possible to more reliably prevent the tape reels 2 from being inclined.

Further, according to the information medium 1, the spring members 6 are arranged in a gap between a main board positioned on a side opposite from a side where the drive shafts 101 that drive the tape reels 2 are inserted, that is, the top board 41 of the upper casing 22, and the sheet 5, whereby the reel bodies 11 can be pressed toward the lower ends 11e, that is, toward the bottom board 31 of the lower casing 21. Therefore, compared with a construction in which the spring members 6 are arranged in a gap between the bottom board 31 and the sheet 5, and the reel bodies 11 are pressed toward the top board 41 by the spring members 6, it is possible to increase the length of respective engaged portions of each hub 12 and an associated one of the drive shafts 101. This makes it possible to reduce the moment acting on the reel bodies 11.

Further, according to the information medium 1, the spring members 6 are fixed to the cover 43 attached to the top board 41, whereby when the information medium 1 is manufactured, the spring members 6 can be arranged accurately and easily simply by fitting the lower casing 21 and the upper casing 22 to each other to thereby assemble the casing body 3. This makes it possible to sufficiently enhance the manufacturing efficiency of the information medium 1. Further, since the spring members 6 are fixed to the cover 43, it is possible to reliably prevent the spring members 6 from being removed from the upper ends 12b of the hubs 12 to be thereby brought into contact with the magnetic tape T e.g., by vibration occurring during conveyance when the components are assembled.

Figure 13:
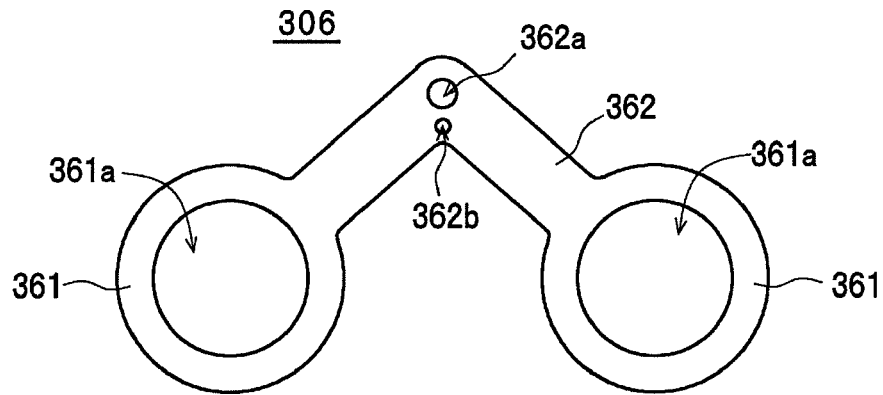
FIG. 13 is a plan view of a variation of the spring members.
Figure 14:
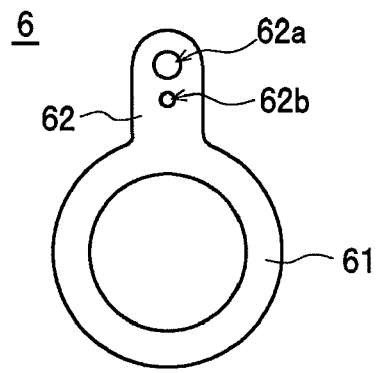
FIG. 14 is a plan view of a variation of the spring member, which is formed with a fixing hole.

It should be noted that the present invention is by no means limited to the above-described configuration. Although in the above-described embodiment, the description has been given of the example in which two spring members 6 formed independently of each other are used, this is not limitative, but a single spring member 306 shown in FIG. 13, for example, can be employed in place of the two spring members 6, as a variation of the spring members. In this case, the spring member 306 is formed by connecting a pair of annular bodies 361, each of which has an insertion hole 361a formed in a central portion thereof and has the same shape as that of the body portion 61 of each spring member 6 described above, using a fixing portion 362 into a unitary member. According to the spring member 306, it can be fixed in a single operation, so that compared with the above-described construction in which a pair of spring members 6 are fixed separately from each other, it is possible to simplify the assembling process, thereby making it possible to enhance the manufacturing efficiency of the information medium 1. In this case, as shown in FIG. 13, it is possible to employ a construction in which not only a fixing hole 362a but also a positioning hole 362b is formed in the spring member 306, while a positioning protrusion is formed on the cover 43, and the positioning protrusion is inserted into the positioning hole 362b to thereby position the spring member 306. Further, as shown in FIG. 14, as another variation of the spring member, it is possible to employ a construction in which not only the fixing hole 62a but also a positioning hole 62b is formed in the fixing portion 62, and a positioning protrusion formed on the cover 43 is inserted into the positioning hole 62b to thereby position the spring member 6.

Figure 15:
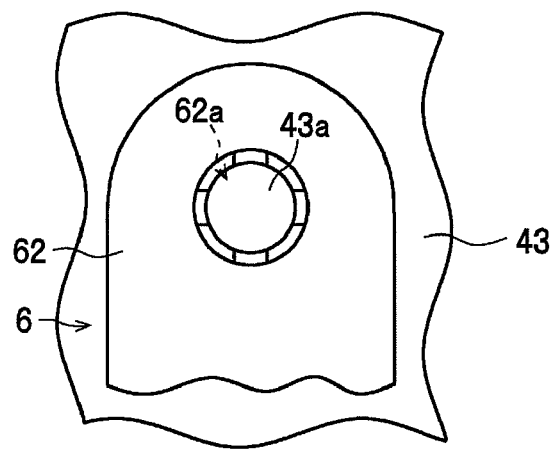
FIG. 15 is a plan view of a variation of the spring member, which is fixed to the cover by another fixing method.
Figure 16:
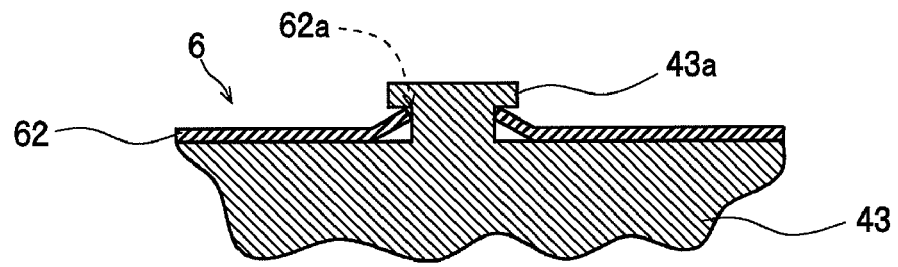
FIG. 16 is a cross-sectional view of another variation of the spring member, which is fixed to the cover by another fixing method.
Figure 17:
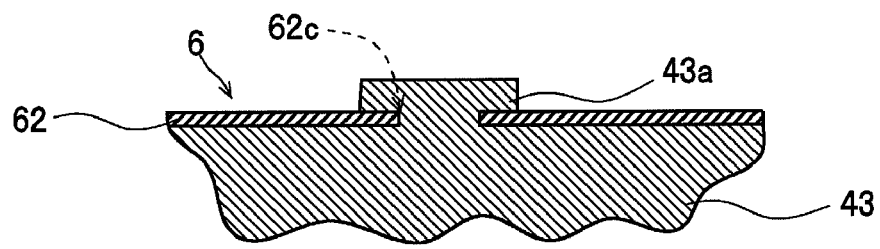
FIG. 17 is a cross-sectional view of another variation of the spring member, which is fixed to the cover by still another fixing method.

Further, although in the above-described embodiment, the description has been given of the example in which the spring members 6 are fixed to the cover 43 (top board 41) by press-fitting the protrusions 43a of the cover 43 into the respective fixing holes 62a, this is not limitative, but as shown in FIGS. 15 and 16, as another variation of the spring member, it is also possible to employ a fixing method in which after press-fitting the protrusions 43a into the respective fixing holes 62a, the fixing portions 62 are caulked by melting the foremost ends of the protrusions 43a. As a further variation, as shown in FIG. 17, it is also possible to employ a fixing method in which a fixing hole 62c having no nail is formed in each fixing portion 62, and the fixing portion 62 is simply caulked by melting the foremost end of an associated one of the protrusions 43a inserted through the fixing hole 62c. Further, it is also possible to use a combination of the above fixing methods.

Further, although in the above-described embodiment, the description has been given of the example in which the spring members 6 are fixed to the top board 41 (cover 43) of the upper casing 22 of the casing body 3, whereby the spring members 6 are arranged in the gap between the sheet 5 disposed toward the upper ends 11c of the reel bodies 11 of the respective tape reels 2 and the top board 41, it is also possible to arrange the spring members 6 in the gap between the sheet 5 disposed toward the lower ends 11e of the reel bodies 11, and the bottom board 31 of the lower casing 21 of the casing body 3. Further, it is also possible to arrange the spring members 6 in both of the gap between the sheet 5 and the top board 41, and the gap between the sheet 5 and the bottom board 31. Further, when the information medium 1 is manufactured, it is also possible to employ a method of arranging the spring members 6 directly at the respective disposing positions without fixing the spring members 6 e.g., to the top board 41 (cover 43).

Figure 18:
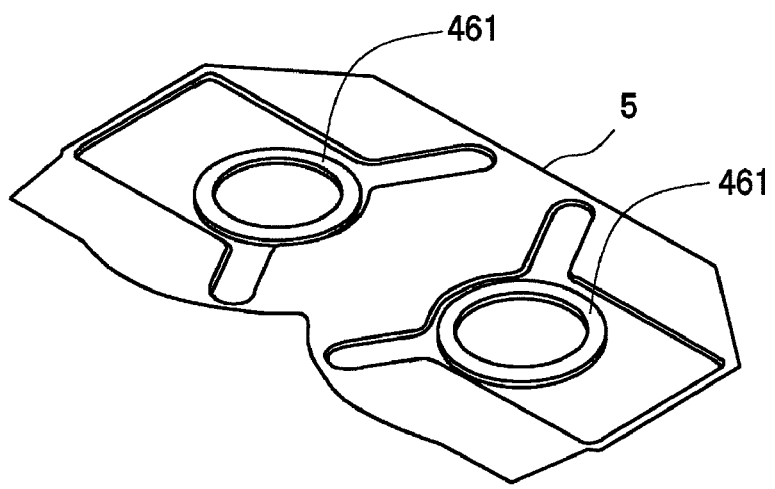
FIG. 18 is a perspective view of the sheet to which a variation of the spring members are fixed.
Figure 19:
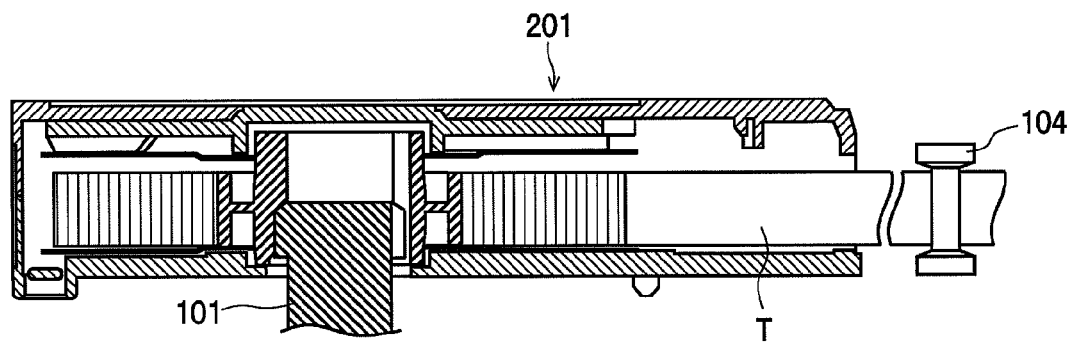
FIG. 19 is a cross-sectional view of a conventional information medium.
Figure 20:
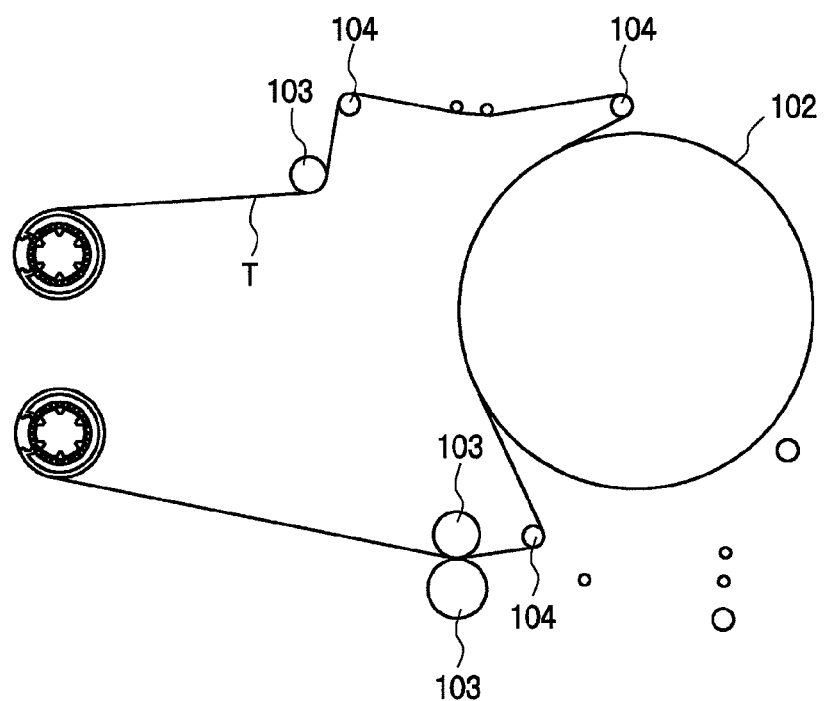
FIG. 20 is a diagram which is useful in explaining a state of the conventional information medium in which a magnetic tape is brought into contact with a rotary head.
Figure 21:
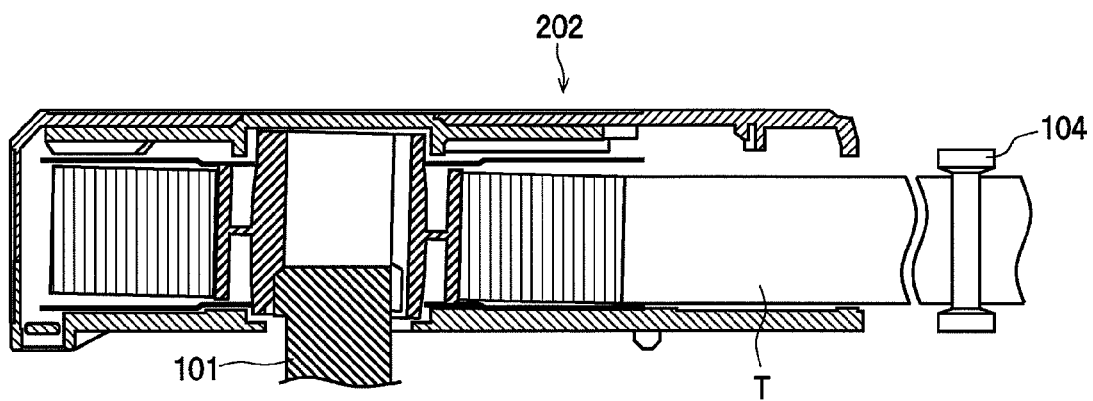
FIG. 21 is a cross-sectional view of a conventional information medium using a magnetic tape increased in width.

Further, as shown in FIG. 18, as a further variation of the spring members, it is also possible to employ a construction in which spring members 461 each having the same shape (annular body) as that of the body portion 61 of each spring member 6 described above are fixed (attached) to the sheet 5 in advance. In this case, the method of fixing the spring members 461 to the sheet 5 may include a method of fixing the same using an adhesive, and a method of fixing the same using a double-faced tape. In assembling an information medium provided with the sheet 5, the spring members 461 are also arranged in a state positioned at predetermined positions simply by positioning the sheet 5 at a predetermined position and disposing the same, and hence it is possible to enhance the manufacturing efficiency of the information medium 1 sufficiently.

Further, although in the above-described embodiment, the description has been given, by way of example, of the information medium 1 for use in backing up data recorded on an electronic computer, the present invention can be applied to various information media, such as an information medium for use in recording image data, and an information medium for use in recording voice data. Further, although in the above-described embodiment, the description has been given of the information medium 1 provided with two tape reels 2, by way of example, the present invention can be applied to an information medium provided with a single tape reel.

What is claimed is:

1. An information medium comprising:
a pair of tape reels each having a hollow cylindrical reel body having a magnetic tape wound therearound, and a hollow cylindrical hub disposed at a central portion of the reel body in a manner such that opposite ends thereof protrude from the reel body;
a casing body rotatably accommodating the pair of tape reels in a state holding opposite ends of the hubs by a pair of main boards facing each other;
a pair of sheet materials each having a pair of insertion holes formed therein, and arranged in the casing body in a manner sandwiching opposite ends of each reel body in a state having opposite ends of the hubs inserted into the insertion holes; and
a pair of plate-shape urging members that are formed separately to the pair of sheet materials and arranged in at least one of a gap between one of the sheet materials, disposed toward respective one ends of the reel bodies, and one of the main boards, and a gap between the other of the sheet materials, disposed toward respective other ends of the reel bodies, and the other of the main boards, each of the pair of plate-shape urging members comprising an annular body portion that has an insertion hole formed in a central portion thereof, and urging only at least one of the opposite ends of each reel body via an associated one of the sheet materials, in a state in which at least one of the opposite ends of each hub is inserted in the insertion hole formed in the body portion, the annular body portion being disposed so as to face only the at least one of the opposite ends of the reel body.

2. The information medium according to claim 1, wherein the body portion of each of the urging members is formed into a bent state and has only three convex portions which can urge three portions of the at least one of opposite ends of each reel body via the associated one of the sheet materials.

3. The information medium according to claim 1, wherein the urging members are arranged in a gap between one of the main boards positioned on a side opposite from a side where drive shafts for driving the tape reels are inserted, and an associated one of the sheet materials.

4. The information medium according to claim 1, wherein the urging members each comprise a fixing portion formed with a fixing hole including a nail, and are fixed to an associated one of the main boards by press-fitting a protrusion formed in the associated one of the main boards into the fixing hole of the fixing portion and deforming the nail.

5. The information medium according to claim 1, wherein the urging members are mounted on an associated one of the sheet materials by using an adhesive.

6. An information medium comprising:
a pair of tape reels each having a hollow cylindrical reel body having a magnetic tape wound therearound, and a hollow cylindrical hub disposed at a central portion of the reel body in a manner such that opposite ends thereof protrude from the reel body;
a casing body rotatably accommodating the pair of tape reels in a state holding opposite ends of the hubs by a pair of main boards facing each other;
a pair of sheet materials each having a pair of insertion holes formed therein, and arranged in the casing body in a manner sandwiching opposite ends of each reel body in a state having opposite ends of the hubs inserted into the insertion holes; and a plate-shape urging member that is formed separately to the pair of sheet materials and arranged in at least one of a gap between one of the sheet materials, disposed toward respective one ends of the reel bodies, and one of the main boards, and a gap between the other of the sheet materials, disposed toward respective other ends of the reel bodies, and the other of the main boards, the plate-shape urging member being formed by connecting a pair of annular body portions, as a unitary member, each of the body portions having an insertion hole formed in a central portion thereof, and urging only at least one of the opposite ends of each reel body via an associated one of the sheet materials, in a state in which at least one of the opposite ends of each hub is inserted in an associated one of the insertion holes formed in the body portion, the annular body portion being disposed so as to face only the at least one of the opposite ends of the reel body.

7. The information medium according to claim 6, wherein the body portion of the urging member is formed into a bent shape and has only three convex portions which can urge three portions of the at least one of the opposite ends of each reel body via the associated one of the sheet materials.

8. The information medium according to claim 6, wherein the urging members are arranged in a gap between one of the main boards positioned on a side opposite from a side where drive shafts for driving the tape reels are inserted, and an associated one of the sheet materials.

9. The information medium according to claim 6, wherein the urging member comprises a fixing portion formed with a fixing hole including a nail, and is fixed to an associated one of the main boards by press-fitting a protrusion formed in the associated one of the main boards into the fixing hole of the fixing portion and deforming the nail.

10. The information medium according to claim 6, wherein the urging member is mounted on an associated one of the sheet materials by using an adhesive.

* * * * *